United States Patent [19]

Lemaire et al.

[11] Patent Number: 5,054,649
[45] Date of Patent: Oct. 8, 1991

[54] RECIPROCATING OBJECT DISPENSER

[75] Inventors: Françoise Lemaire; Jean-Michel Farce, both of Paris, France

[73] Assignee: I.G. Design, Paris, France

[21] Appl. No.: 515,423

[22] Filed: Apr. 27, 1990

[51] Int. Cl.⁵ .............................................. B65G 59/00
[52] U.S. Cl. ................................... 221/248; 221/269; 221/293
[58] Field of Search ............... 221/247, 248, 269, 293, 221/292, 81, 83, 228

[56] References Cited

U.S. PATENT DOCUMENTS

| | | | |
|---|---|---|---|
| 2,893,599 | 7/1959 | Kay | 221/260 |
| 3,854,625 | 12/1974 | Kuebler | 221/198 |
| 4,984,288 | 1/1991 | Petterson | 221/269 |

FOREIGN PATENT DOCUMENTS

| | | |
|---|---|---|
| 337907 | 7/1977 | Austria . |
| 141081 | 7/1901 | Fed. Rep. of Germany . |
| 1299572 | 7/1969 | Fed. Rep. of Germany . |
| 385413 | 3/1965 | Switzerland . |

Primary Examiner—Joseph E. Valenza
Assistant Examiner—Kenneth Noland
Attorney, Agent, or Firm—Dennison, Meserole, Pollack & Scheiner

[57] ABSTRACT

The dispenser comprises a body forming a magazine for objects to be dispensed and terminated by a tubular neck defining a dispensing chamber suitable for receiving a determined number of objects to be dispensed on a first occasion, the number being equal to or greater than one, and a tubular head capable of sliding over the outside of the neck. When the head is pushed onto the neck by pressing the free end of the head down onto a reception surface, the free end of the neck resiliently deforms a shutter diaphragm so as to allow the objects to be dispensed to fall out onto the reception surface, while resilient tongues cut out in the wall of the neck serve to retain the next object. After pressure has been released, the resilience of the diaphragm gives rise to a reverse movement with the tongues releasing the objects to be dispensed during the following movement while the diaphragm closes in order to hold the objects in the dispensing chamber.

17 Claims, 1 Drawing Sheet

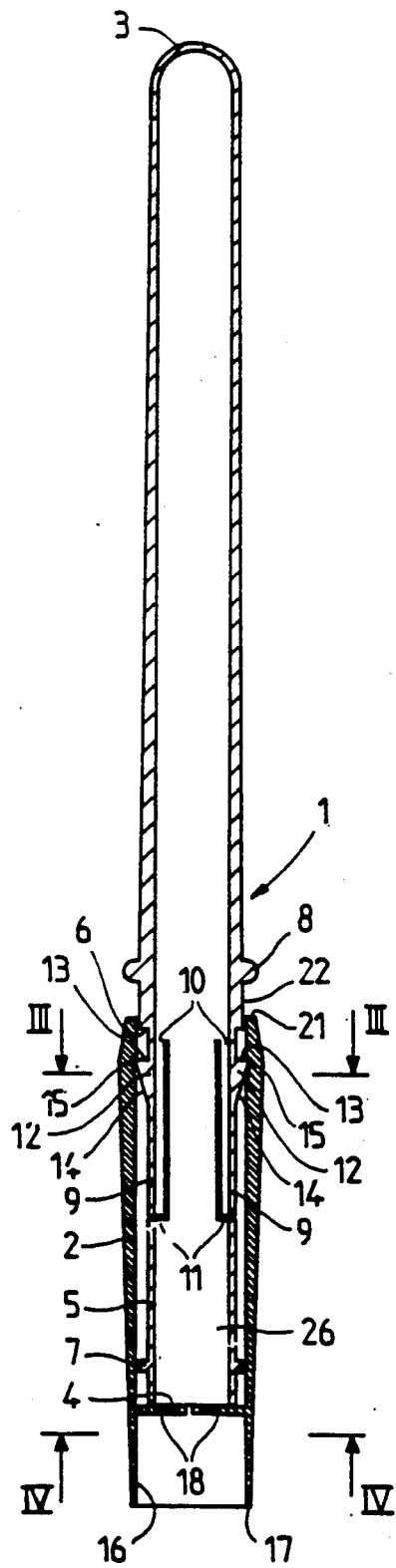
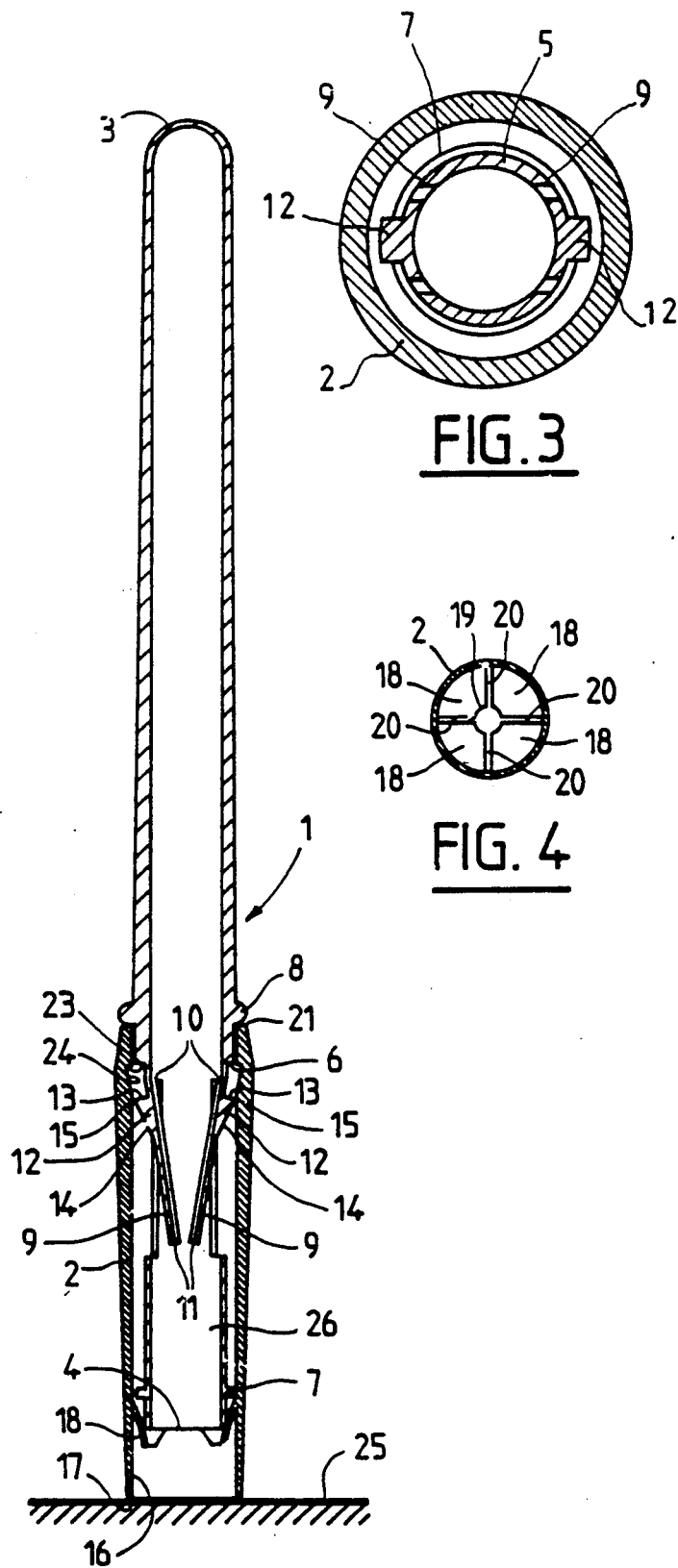
FIG. 3
FIG. 4
FIG. 1
FIG. 2

RECIPROCATING OBJECT DISPENSER

The invention relates to a device for dispensing objects, intended to take a predetermined number of objects on request from a supply of equivalent objects having approximately the same dimensions, and to deliver the objects taken in this way, said number being equal to or greater than one.

BACKGROUND OF THE INVENTION

Such devices are used in a wide range of applications. For example, when integrated in manufacturing lines, they may be used for delivering blanks for machining or components to be mounted in an assembly. In portable form they may be used for dispensing medicines or candies, for example.

Object dispenser devices are known comprising a first member forming a magazine for the objects to be dispensed and a second member capable of performing reciprocating translation motion relative to the first member so as to release a predetermined number of objects for each back-and-forth movement.

The object of the invention is to provide such a device having some or all of the following properties:

the ability to dispense objects of geometrically complex shapes;

adequate tolerance concerning the sizes of the objects dispensed;

simplicity in design and operation;

excellent reliability in operation, without jamming and without dispensing the wrong number of objects and without damaging the objects; and if the device is portable, ease of use even for physically handicapped users.

SUMMARY OF THE INVENTION

To this end, the present invention provides a device of the above-described type comprising:

a dispensing chamber provided with a retractable shutter suitable for receiving the said number of objects to be dispensed;

means for bringing the objects contained in the magazine successively into the dispensing chamber, said means defining a single retaining location which, after each back-and-forth movement, contains the next object that is to enter the chamber;

retractable retaining means for holding the object in the said retaining location;

shutter retraction means suitable for responding to said reciprocating motion for opening a passage sufficient during a fraction of the back-and-forth movement for enabling the object(s) contained in the dispensing chamber to leave it; and means for engaging the retaining means and subjected to the said reciprocating motion to hold the object present in the retaining location at least while the shutter is leaving the passage disengaged.

In particular, the invention provides a device in which in order to penetrate into the dispensing chamber and to leave it, the objects move relative to the chamber substantially along the translation axis of said reciprocating motion.

Advantageously, the action of the shutter retracting means and of the means for engaging the retaining means depends solely on the instantaneous relative position of the first and second members, with said means beginning to act during the backwards stroke during which the second member moves relative to the first member in the opposite direction to the object displacement direction, and they cease to act during the forwards stroke.

In one embodiment of the invention, the shutter belongs to the second member and the corresponding retraction means comprise an abutment belonging to the first member and bearing against the shutter in order to retract it during said motion, said abutment being constituted, for example, by an end edge of a chamber-delimiting wall of the first member.

The invention also provides for the retaining means to comprise at least one resiliently deformable tongue for penetrating into the said location under the action of the engagement means. Said tongue may be cut out from a wall of the first member disposed as an extension of a wall limiting the dispensing chamber.

In accordance with another characteristic of the invention, the engagement means comprise co-operating surfaces of the first and second members including at least one ramp for transforming the relative translation motion of the members into motion of the retaining means transversely to the above.

It is also advantageous to provide abutment means on the first and second members in order to limit their relative translation motion, and in some cases to provide resilient return means for these two members urging them towards a determined relative position.

BRIEF DESCRIPTION OF THE DRAWING

Other characteristics and advantages of the invention appear from the following detailed description given by way of example and with reference to the accompanying drawing, in which:

FIGS. 1 and 2 are longitudinal section views through an object dispensing device of the invention shown in respective ones of the two extreme positions of the relative motion of its two members; and FIGS. 3 and 4 are cross-section views respectively on lines III—III and IV—IV of FIG. 1.

DETAILED DESCRIPTION

The device shown is a portable device intended for dispensing pills one by one for treating rheumatoid arthritis. It is therefore designed to be easily handled by a patient suffering from this disease, i.e. a person who has limited movement in the fingers.

The device is made of two pieces of plastic only, e.g. polyethylene or polypropylene, comprising a body 1 and a sleeve 2. The body 1 is generally tubular in shape being closed at one end 3 and open at its opposite end 4. The inside diameter of the body 1 is substantially constant over its entire length while its wall thickness and consequently its outside diameter vary and are practically minimal over a neck portion 5 lying between the open end 4 and a shoulder 6. The neck 5 of the body has a circumferential outer rib 7 in the vicinity of the end 4 with the outside diameter of the rib corresponding substantially to the outside diameter of the shoulder 6. Another outer circumferential rib 8 is provided in the vicinity of the shoulder 6 between the shoulder and the end 3. The thin wall of the neck 5 is cut out to form two longitudinally extending flexible tongues 9. These two tongues are diametrically opposite each other and they are attached to the remainder of the wall at 10 in the vicinity of the shoulder 6, with their free ends 11 being directed towards the open end 4 of the body. The outer face of each tongue 9 has a projection 12 disposed closer to its connection 10 than to its free end 11. The projection 12 is delimited towards the end 3 by a plane radial surface 13 facing the shoulder 6, and towards the outside of the body and towards the open end 4 by an inclined surface or ramp 14 tapering towards the axis of the tube when going towards the end 4. The surfaces 13 and 14 together form an acute angle ridge 15 situated at a distance from the axis of the tubular body which is greater than the outside radius of the shoulder 6 and of the rib 7.

The head 2 constitutes a tubular sleeve whose inside diameter is also substantially constant over its entire length with a varying wall thickness and outside diameter, the inside diameter being slightly larger than the outside diameter of the rib 7 and of the section 22 of the body lying between the shoulder 6 and the rib 8. Four flexible flaps 18 project from the inside face 16 of the sleeve in the vicinity of one end 17 thereof, with the flaps extending in a radial plane when in the rest position as shown in FIGS. 1 and 4 so as to close the inside space of the sleeve while leaving only an axial circular opening 19 and four radial slots 20 connected to the opening 19 and extending to the wall of the sleeve. The head 2 is threaded onto the neck 5 of the body while in this position with its flaps 18 coming substantially adjacent to the open end 4 of the body and with the end 17 of the head being directed in the same direction as said end 4. The opposite end 21 of the head surrounds the section 22 of the body lying between the shoulder 6 and the rib 8 and is at a certain distance from the rib 8. The head 2 is substantially coaxial on the body 1 because of guidance provided by the rib 7 and the section 22 co-operating with the inside face 16 of the head.

The inside face 16 of the sleeve 2 has an annular recess close to the end 21, the recess being delimited by a substantially plane radial surface 23 and by a substantially frustoconical surface or ramp 24 which slopes towards the axis going away from the surface 23 towards the end 17. The surface 23 faces the surfaces 13 of the projections 12 presented by the tongues 9 of the body, and comes into abutment therewith in the position shown in FIG. 1 in order to limit the relative sliding motion of the head over the body and prevent these two parts coming apart. In this position, the ridges 15 of the projections 12 are received in the annular recess of the head.

The device operates as follows. Before the two parts are assembled to each other, pills (not shown) are inserted into the body 1. This assembly is performed by threading the end 21 of the head 2 over the neck 5 of the body. When the end 21 comes into contact with the projections 12 of the tongues 9, it co-operates with the ramps 14 to urge the tongues to bend resiliently towards the axis of the body, thereby retracting the projections 12 and enabling them to be passed over by the section of the head lying between its end 21 and the annular recess defined by the surfaces 23 and 24. The tongues then return to the position shown in FIG. 1 under the effect of their own resilience, with the ridges 15 of the projections 12 penetrating into the recess in order to prevent the head being withdrawn.

In order to release one of the pills contained in the body 1, the device is turned head down as shown in FIG. 1 and the free end 17 of the head is pressed against a more or less horizontal reception surface 25 (FIG. 2), which surface may be the top of a table or the palm of one of the user's hands, with the other hand holding the body 1. In this position, a first pill rests against the flap 18 and is situated inside the chamber 26, while a second pill resting on the first lies between the ends 11 of the tongues 9. The body is then thrust axially downwards or else the head is thrust vertically upwards by means of the palm. This gives rise to relative translation motion between the two parts and this in turn gives rise to the following two actions, as illustrated in FIG. 2.

Firstly the ridges 15 of the tongues 9 sweep over the surface of the ramp 24 of the inside face 16 of the sleeve which urges them progressively towards the inside of the body while resiliently deforming the tongues. The free ends 11 of the tongues then clamp the second pill between each other, thus holding it stationary relative to the body.

Secondly, the free end 4 of the neck 5 thrusts the flaps 18 of the head axially downwards with the flaps bending resiliently and progressively releasing a passage that is larger than the opening 19. Once this passage is large enough, the first pill which was resting on the flaps 18 passes through the passage and falls onto the surface 25.

When the first pill leaves the device, the second is already held stationary by the tongues 9 as described above and consequently it does not leave the body during the same movement.

The backwards stroke of this movement is stopped by the end 21 of the head coming into abutment against the rib 8 of the body. If the body is then lifted, relative forwards motion is ensured by the resilience of the flaps 18 returning the flaps to the radial position shown in FIG. 1 and pushing the end 4 of the body upwards. This forwards motion releases the tongues 9 which splay apart and release the second pill which falls onto the flaps 18 and is retained thereby since the passage released by the flaps is again too small to allow the pill to pass therethrough, by virtue of the symmetry of the back-and-forth movement.

Naturally the device may be designed to dispense a number of objects greater than one on each dispensing movement, with the number of objects being determined by the relationship between the dimensions of the objects and the length of the dispensing chamber 26 formed by the portion of the neck 5 situated downstream from the tongues 9. In order to ensure that the desired number of objects is dispensed reliably, the cross-section of the neck 5 must be designed as a function of the dimensions of the objects so as to ensure that they are in alignment in a single column, and if these dimensions differ in different directions, so as to ensure that the objects occupy substantially the same length in the longitudinal direction of the neck. It is also clear that when the head projects beyond the shutter as described in order to deposit the, or each, object to be dispensed on a thrust surface, the dimensions of the volume thus released downstream from the shutter must be large enough to receive the object(s) without preventing the shutter closing again, with account being taken, where necessary, of the extent to which the palm of the hand may project into said volume.

Projections (not shown) may be provided on the outer surface of the body 1 in order to facilitate holding it in the hand.

When the head 9 is manufactured, e.g. by molding, the slots 20 may be bridged by sprue holding the flaps 18 in place, with the sprue bridges being broken the first time the device is used. By having such breakable connections, it is possible for a patient purchasing a device filled with medicine to verify that no medicine has been removed before.

When the resilient force of the shutter is not sufficient to ensure the forwards stroke of the reciprocating motion, distinct resilient return means may be provided for this purpose.

When it is desired that the head of the device should not be pressed against a reception surface, the portion thereof projecting beyond the shutter may be smaller or omitted.

Naturally the body need not be tubular in shape with a constant circular cross-section. It may have a different section and/or it may be enlarged in those portions which are at a distance from the exit end, providing the objects to be dispensed are still brought one by one at least to the retaining location. The closed end 3 may be replaced by a removable plug enabling the device to be refilled. For a fixed device, the body may be open at its end furthest from its exit end, and may be constituted by a hopper, for example, in particular on a manufacturing line. The body may alternatively be in the form of a gutter or channel extending substantially downwards and open on one side.

We claim:

1. A device for dispensing objects, the device comprising a first member forming a magazine for the objects to be dispensed and a second member capable of performing reciprocating motion in translation relative to the first member in order to release a predetermined number of objects during each back-and-forth movement of said motion, the device comprising:
    a dispensing chamber, provided with a retractable shutter and suitable for receiving the said number of objects;
    means for bringing the objects contained in the magazine successively into the dispensing chamber, said means defining a single retaining location which, after each back-and-forth movement, contains the next object that is to enter the chamber;
    retractable retaining means for holding in place the object that is to be found in the said retaining location;
    means for retracting the shutter and adapted, under the action of said reciprocating motion, to open a passage during a fraction of the duration of a back-and-forth movement, said passage being large enough to allow the object(s) contained in the dispensing chamber to exit therefrom; and
    means subjected to the action of said reciprocating motion for engaging the retaining means to hold the object present in said retaining location at least during the time that the passage is opened by retraction of the shutter;
    wherein the shutter is on the second member and the corresponding means for retracting the shutter comprises an abutment on the first member and bearing against the shutter in order to retract it during said reciprocating motion.

2. A device according to claim 1, wherein in order to penetrate into the chamber and in order to leave it, the objects move relative thereto substantially along the translation axis of said reciprocating motion.

3. A device according to claim 2, wherein the means for retracting the shutter and the means for engaging the retaining means begin to act during the backwards movement during which the second member moves relative to the first member in the opposite direction to the object dispensing direction, and cease to act during the forwards movement.

4. A device according to claim 1, wherein the said abutment comprises an end edge of a wall of the first member delimiting said dispensing chamber.

5. A device according to claim 1, wherein the retaining means comprises at least one resiliently deformable tongue for penetrating into said retaining location under the action of said means for engaging the retaining means.

6. A device according to claim 5, wherein said tongue is cut out from a wall of the first member disposed in alignment with a wall delimiting the dispensing chamber.

7. A device according to claim 1, wherein the means for engaging the retaining means comprises co-operating elements of the first and second members including at least one ramp for transforming the relative translation motion thereof into motion of the retaining means in a direction transverse to the direction of the preceding motion.

8. A device according to claim 1, wherein the first and second members have abutment means for limiting their relative translation motion.

9. A device according to claim 1, including resilient return means for urging the first and second members towards a determined relative position.

10. A device according to claim 1, wherein the first member terminates at one end in a neck defining the said retaining location and said dispensing chamber, and the second member is a sleeve slidable over the outside of the neck between a first extreme position where the second member is minimally engaged on the neck and in which the shutter is closed and the retaining means is retracted, and a second maximally engaged position in which the shutter is retracted and the retaining means is engaged, said second member having at least one radially inwardly directed projection which is resiliently deformable and comprises the retractable shutter, the means for retaining the shutter comprising the free end of the neck.

11. A device according to claim 10, wherein the shutter is substantially adjacent to the free end of the neck in said first position and has sufficient resilience to return the second member from said second position to said first position.

12. A device according to claim 10, wherein the retaining means comprises resilient tongues cut out longitudinally in a wall of the neck level with said retaining location.

13. A device according to claim 12, wherein the means for engaging the retaining means comprises projections provided on an outside surface of the tongues and co-operating ramps provided on an inside surface of the sleeve.

14. A device according to claim 13, wherein the inside surface of the sleeve has abutment means co-operating with said projections of the tongues in order to limit the motion of the said second member when at said first extreme position.

15. A device according to claim 10, wherein an outer surface of the first member has an abutment co-operating with an end of the sleeve in order to limit the motion of the second member when at said second extreme position.

16. A portable device according to claim 10, wherein the first member comprises a closed receptacle for containing a supply of objects to be dispensed.

17. A device according to claim 16, wherein the sleeve extends beyond the shutter in order to define, in co-operation with a reception surface on which the free edge of the sleeve is pressed downwardly, a reception compartment for the object(s) released from the chamber by the downwards motion of the first member relative to the reception surface.

* * * * *